(12) United States Patent
Ikeda

(10) Patent No.: US 12,454,011 B2
(45) Date of Patent: Oct. 28, 2025

(54) INSERT, CUTTING TOOL, AND METHOD FOR CUTTING WORKPIECE USING THE CUTTING TOOL

(71) Applicant: KYOCERA CORPORATION, Kyoto (JP)

(72) Inventor: Yoshihito Ikeda, Ritto (JP)

(73) Assignee: KYOCERA CORPORATION, Kyoto (JP)

( * ) Notice: Subject to any disclaimer, the term of this patent is extended or adjusted under 35 U.S.C. 154(b) by 565 days.

(21) Appl. No.: 17/757,145

(22) PCT Filed: Dec. 11, 2020

(86) PCT No.: PCT/JP2020/046298
§ 371 (c)(1),
(2) Date: Jun. 10, 2022

(87) PCT Pub. No.: WO2021/117872
PCT Pub. Date: Jun. 17, 2021

(65) Prior Publication Data
US 2023/0056761 A1     Feb. 23, 2023

(30) Foreign Application Priority Data
Dec. 11, 2019 (JP) ................................. 2019-223521

(51) Int. Cl.
*B23B 27/14* (2006.01)
(52) U.S. Cl.
CPC ...... *B23B 27/143* (2013.01); *B23B 2200/321* (2013.01); *B23B 2200/328* (2013.01)
(58) Field of Classification Search
CPC .............. B23B 27/1607; B23B 27/143; B23B 27/1611; B23B 27/1603; B23B 27/141;
(Continued)

(56) References Cited

U.S. PATENT DOCUMENTS

| 8,672,590 B2 * | 3/2014 | Tanaka ................. B23B 27/141 407/115 |
| 2002/0154958 A1 * | 10/2002 | Kasperik ............... B23B 27/143 407/115 |

(Continued)

FOREIGN PATENT DOCUMENTS

| CA | 2774671 A1 * | 4/2011 | ........... B23B 27/141 |
| CN | 103551615 A  * | 2/2014 | ............. B23B 27/22 |

(Continued)

OTHER PUBLICATIONS

English Translation for WO2014192798A1 (Year: 2014).*
English KR100312957B1 Translation (Year: 2001).*
English WO2011037186A1 Translation (Year: 2011).*

*Primary Examiner* — Ryan Rufo
(74) *Attorney, Agent, or Firm* — HAUPTMAN HAM, LLP

(57) ABSTRACT

A cutting insert may include an upper surface, a lateral surface, and a cutting edge including a boundary between the upper surface and the lateral surface. The upper surface may include a first rising face that extends upward and a second rising face that is connected to an upper side of the first rising face and extends upward. The first rising face may include a first region that extends along a corner portion and a second region that extends along a side portion. The second rising face may include a third region connected to the first region and a fourth region connected to the second region. An entirety of a boundary between the first region and the third region may be positioned above the cutting edge. A boundary between the second region and the fourth region may include a portion disposed below the cutting edge.

15 Claims, 9 Drawing Sheets

(58) Field of Classification Search
CPC ............ B23B 27/145; B23B 2200/321; B23B 2200/081; B23B 2200/087; B23B 2200/286; B23B 2200/328; B23B 27/1618; B23B 27/1637; B23B 27/1648; B23B 2200/32; B23B 2200/325; B23C 2200/323; B23C 5/205
USPC .......................................................... 82/111
See application file for complete search history.

(56) References Cited

U.S. PATENT DOCUMENTS

| | | | |
|---|---|---|---|
| 2007/0116531 A1 | 5/2007 | Okita et al. | |
| 2007/0253787 A1* | 11/2007 | Ishii | B23B 27/141 407/113 |
| 2009/0226269 A1* | 9/2009 | Iyori | B23B 27/143 407/113 |
| 2011/0229279 A1* | 9/2011 | Kobayashi | B23B 27/143 407/115 |
| 2012/0093595 A1* | 4/2012 | Choi | B23C 5/06 407/113 |
| 2012/0170987 A1* | 7/2012 | Komatsuka | B23B 27/141 407/115 |
| 2012/0230785 A1* | 9/2012 | Chen | B23B 27/141 407/114 |
| 2015/0283617 A1* | 10/2015 | Nagarajan | B23B 27/143 407/114 |
| 2016/0214180 A1* | 7/2016 | Sasaki | B23B 27/141 |
| 2019/0039146 A1* | 2/2019 | Bar Hen | B23B 27/145 |

FOREIGN PATENT DOCUMENTS

| | | | | |
|---|---|---|---|---|
| EP | 3560638 A1 | * | 10/2019 | ............... B23B 1/00 |
| JP | 2009202324 A | * | 9/2009 | |
| JP | 2019141936 A | | 8/2019 | |
| KR | 100312957 B1 | * | 11/2001 | ............. B23B 27/22 |
| KR | 100661527 B1 | * | 12/2006 | |
| KR | 20080008530 A | * | 1/2008 | ........... B23B 27/141 |
| KR | 20100079401 A | * | 7/2010 | ......... B23B 27/1611 |
| KR | 101039888 B1 | * | 6/2011 | |
| KR | 20130048531 A | * | 5/2013 | ......... B23B 27/1611 |
| SE | 1350345 A1 | * | 9/2014 | ............. B23B 27/22 |
| WO | 2005068117 A1 | | 7/2005 | |
| WO | WO-2010058856 A1 | * | 5/2010 | ........... B23B 27/143 |
| WO | WO-2011037186 A1 | * | 3/2011 | ........... B23B 27/141 |
| WO | WO-2011122242 A1 | * | 10/2011 | ........... B23B 27/141 |
| WO | WO-2012067114 A1 | * | 5/2012 | ........... B23B 27/141 |
| WO | WO-2013129016 A1 | * | 9/2013 | ........... B23B 27/143 |
| WO | WO-2014192798 A1 | * | 12/2014 | ........... B23B 27/143 |
| WO | WO-2015119258 A1 | * | 8/2015 | ........... B23B 27/143 |
| WO | WO-2017135469 A1 | * | 8/2017 | ........... B23B 27/007 |
| WO | WO-2018042957 A1 | * | 3/2018 | ............. B23B 27/14 |

* cited by examiner

INSERT, CUTTING TOOL, AND METHOD FOR CUTTING WORKPIECE USING THE CUTTING TOOL

CROSS-REFERENCE TO RELATED APPLICATION

This application is a national stage entry according to 35 U.S.C. 371 of PCT Application No. PCT/JP2020/046298 filed on Dec. 11, 2020, which claims priority to Japanese Application No. 2019-223521 filed Dec. 11, 2019.

TECHNICAL FIELD

The present disclosure may relate to an insert, a cutting tool, and a method for cutting a workpiece using the cutting tool.

BACKGROUND ART

A piece of wood, metal, or other materials (hereinafter referred to as a workpiece), for example, may be cut by a cutting tool while the workpiece is fixed to a machine tool. The cutting tool used to cut the workpiece may include, for example, an insert having a cutting edge that faces outward. The insert may come into contact with the workpiece to cut the workpiece into a desired size and shape. A known example of such an insert may be disclosed in International Publication No. 2005/068117 (Patent Literature 1).

SUMMARY OF INVENTION

A basic structure according to an embodiment of the present disclosure may include an upper surface, a lower surface positioned at a side opposite to a side at which the upper surface is positioned, a lateral surface that connects the upper surface and the lower surface, and a cutting edge including a boundary between the lateral surface and the upper surface. The upper surface may include a corner portion positioned at a boundary between the upper surface and the lateral surface, the corner portion having a shape of a curved line that is outwardly convex in a plan view; a side portion connected to the corner portion and forming the cutting edge together with the corner portion; a rake face that extends along the side portion and the corner portion and is inclined downward from the side portion and the corner portion; a first rising face that is separated from the cutting edge with the rake face disposed therebetween and extends upward with increasing distance from the cutting edge; and a second rising face that is connected to an upper portion of the first rising face and extends upward with increasing distance from the first rising face. The first rising face may include a first region that extends along the corner portion and a second region that extends along the side portion. The second rising face may include a third region that extends along the corner portion and that is connected to the first region and a fourth region that extends along the side portion and that is connected to the second region. An inclination angle of the first region of the first rising face may be greater than an inclination angle of the third region of the second rising face in a sectional view taken along a bisector of the corner portion. An inclination angle of the second region of the first rising face may be greater than an inclination angle of the fourth region of the second rising face in a sectional view taken in a direction straight to the side portion. An entirety of a first boundary, which is a boundary between the first region and the third region, may be positioned above the cutting edge. A second boundary, which is a boundary between the second region and the fourth region, may include a portion positioned below the cutting edge.

A cutting tool according to an embodiment of the present disclosure may include a holder having a length extending from a first end to a second end and the above-described cutting insert that is fixed at the first end.

A method for cutting a workpiece according to an embodiment of the present disclosure may include the steps of rotating a workpiece; cutting the workpiece by bringing the above-described cutting tool into contact with the workpiece that is being rotated; and removing the cutting tool from the workpiece that has been cut.

DESCRIPTION OF EMBODIMENTS

Figure 2:
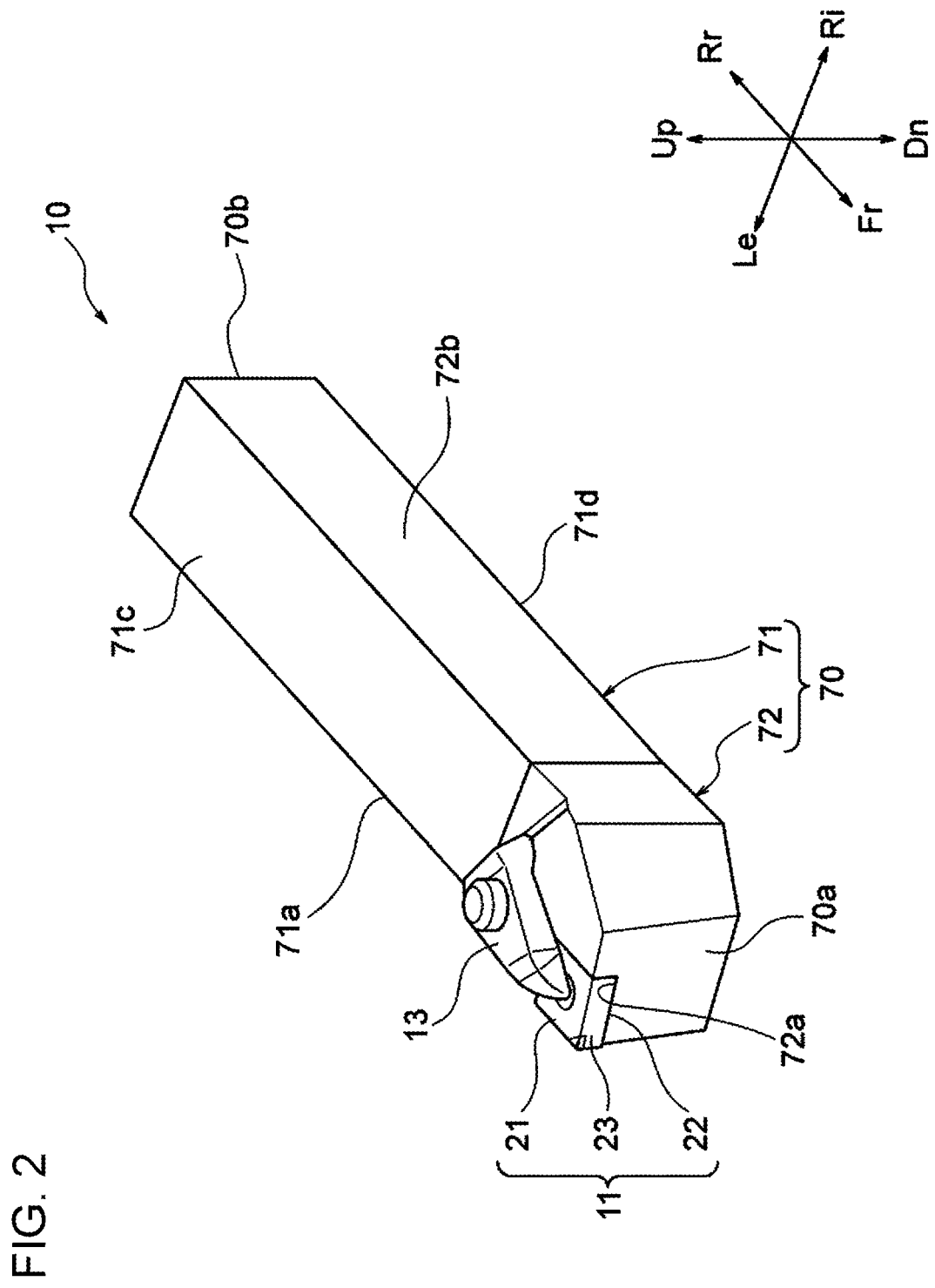
FIG. 2 is a perspective view of the cutting tool illustrated in FIG. 1.

An embodiment of the present disclosure will now be described with reference to the accompanying drawings. With reference to FIG. 2, front, rear, left, right, up, and down directions may be denoted by Fr, Rr, Le, Ri, Up, and Dn, respectively. The drawings referred to below may be schematic, and details may be omitted.

In addition, the front, rear, left, right, up, and down directions mentioned above may be directions in the accompanying drawings, and do not limit the front, rear, left, right, up, and down directions in the real space. In other words, the above-described directions are not intended to limit directions in the real space.

Embodiment

Figure 1:
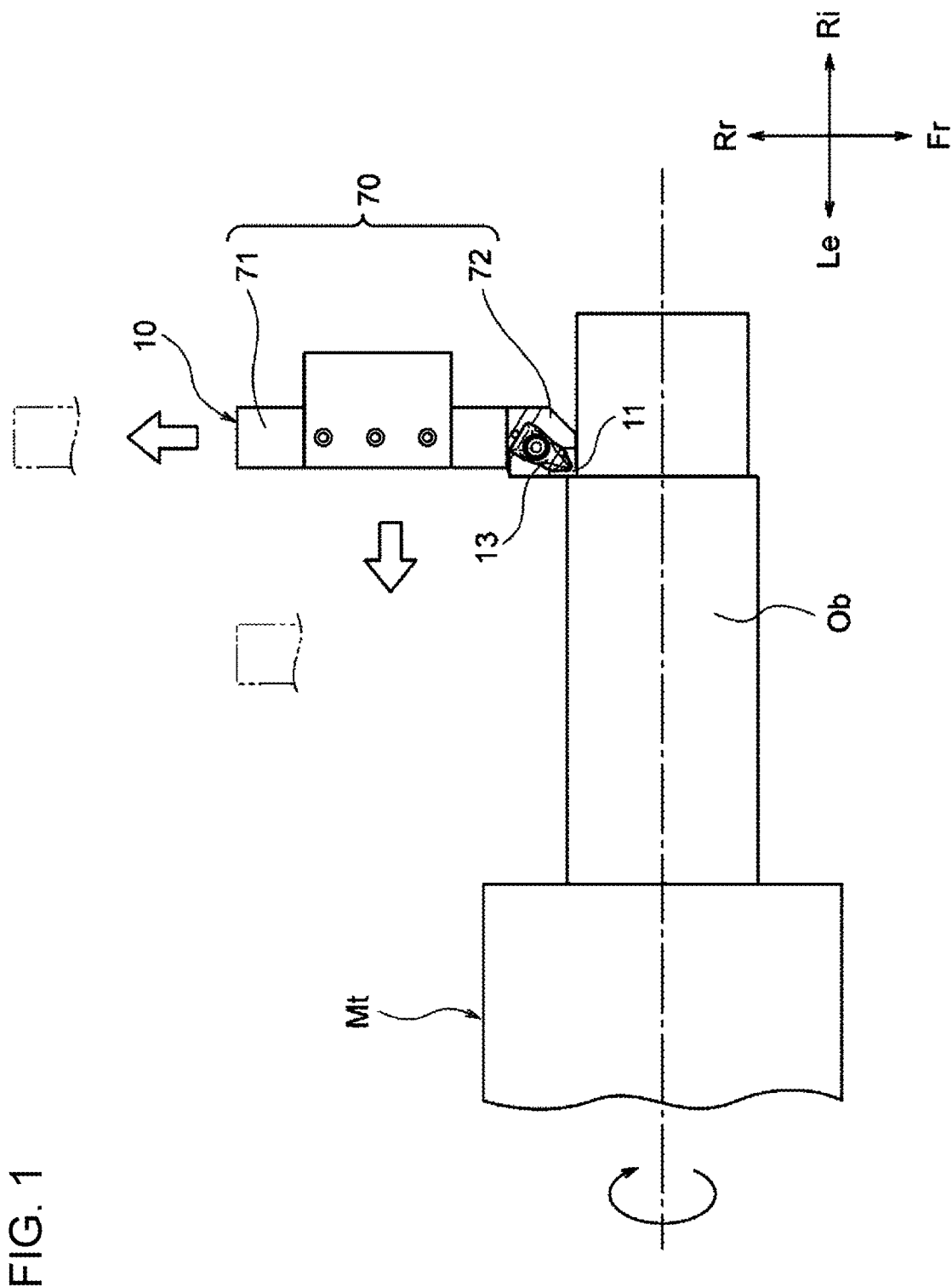
FIG. 1 illustrates a situation in which a workpiece is being cut by a cutting tool attached to a machine tool.

Reference may be made to FIG. 1. A workpiece Ob (wood, metal, or other materials) and a cutting tool 10 may be fixed to, for example, a machine tool Mt. The workpiece Ob may be rotatable by the machine tool Mt, and the cutting tool 10 may be movable in the front, rear, left, right, up, and down directions by the machine tool Mt. A cutting insert 11 (hereinafter referred to as an insert) capable of cutting the workpiece Ob may be positioned at a distal end of the cutting tool 10. The insert 11 may be pressed against the workpiece Ob that is rotated to cut the workpiece Ob into a desired size and shape.

(Cutting Tool)

The cutting tool 10 may be detachably attached to the machine tool Mt (tool post). The cutting tool 10 may be, for example, an external cutting tool for cutting an external surface of the workpiece Ob, an internal cutting tool for cutting an internal surface of the workpiece Ob, a grooving tool for forming a groove in the workpiece Ob, a threading tool, or a cut-off tool. The cutting tool 10 may also be referred to as a tool bit.

Reference may be made to FIG. 2. As illustrated in FIG. 2, the cutting tool 10 may include the insert 11, a holder 70 that supports the insert 11, and a clamp 13 that urges the insert 11 against the holder 70. The insert 11 may be fixed to a distal end (hereinafter referred to also as a first end 70a) of the holder 70. Elements of the cutting tool 10 will now be described. First, the insert 11 removed from the holder 70 will be described. Next, the holder 70 to which the insert 11 is attached will be described. The clamp 13 will described in the descriptions of the insert 11 and the holder 70.

(Insert)

As illustrated in FIG. 2, the insert 11 may be a replaceable insert referred to as a throw-away insert. The insert 11 may be disposed in a pocket 72a and fixed by the clamp 13. The pocket 72a may be recess formed at a distal end 70a (hereinafter referred to also as a first end 70a) of the holder 70.

The insert 11 may have any shape. The shape of the insert 11 may be set in accordance with the material, shape, etc., of the workpiece Ob (see FIG. 1). As illustrated in FIG. 2, the insert 11 may be quadrangular plate-shaped. In other embodiments, the insert 11 may be triangular plate-shaped or pentagonal plate-shaped. The insert 11 may be either symmetrical (as illustrated) or asymmetrical about a plane that is parallel to the up-down direction and that includes line VA-VA (see FIG. 4).

The insert 11 may have any size. The insert 11 may have a thickness (length in the up-down direction) of, for example, 5 mm or more and/or 20 mm or less. The insert 11 may have a width (length in the left-right direction) of, for example, 10 mm or more and/or 20 mm or less.

The insert 11 may be made of any material. For example, the material of the insert 11 may be a polycrystalline diamond (PCD), a cubic boron nitride (CBN), or a cemented carbide. The CBN may be a sintered composite material obtained by combining, for example, a ceramic and a metal. Examples of the CBN may include a titanium compound containing TiC and/or TiN as a main component. Examples of the cemented carbide may include WC—Co, WC—TiC—Co, and WC—TiC—TaC—Co. WC, TiC, and TaC may be hard particles. Co may be a bonding phase.

The insert 11 may be made of one type of material or a plurality of types of materials. The insert 11 made of a plurality of types of materials may include, for example, a portion made of a CBN and the remaining portion formed of a cemented carbide. The insert 11 made of the CBN and the cemented carbide may be formed such that, for example, the ratio of the content of the CBN to that of the cemented carbide is 1% or less, 3% or less, 7% or less, or 7% or more. For example, the insert 11 may be formed such that only a distal end thereof that is pressed against the workpiece Ob (see FIG. 1) is made of the CBN. In other words, the ratio of the content of the CBN to the content of the cemented carbide may be small. Thus, the amount of the CBN, which is more expensive than the cemented carbide, can be reduced. As a result, the insert 11 that is inexpensive can be provided. The description of the ratio between the CBN and the cemented carbide may be applied also to the ratio between the PCD and the cemented carbide.

Figure 3:
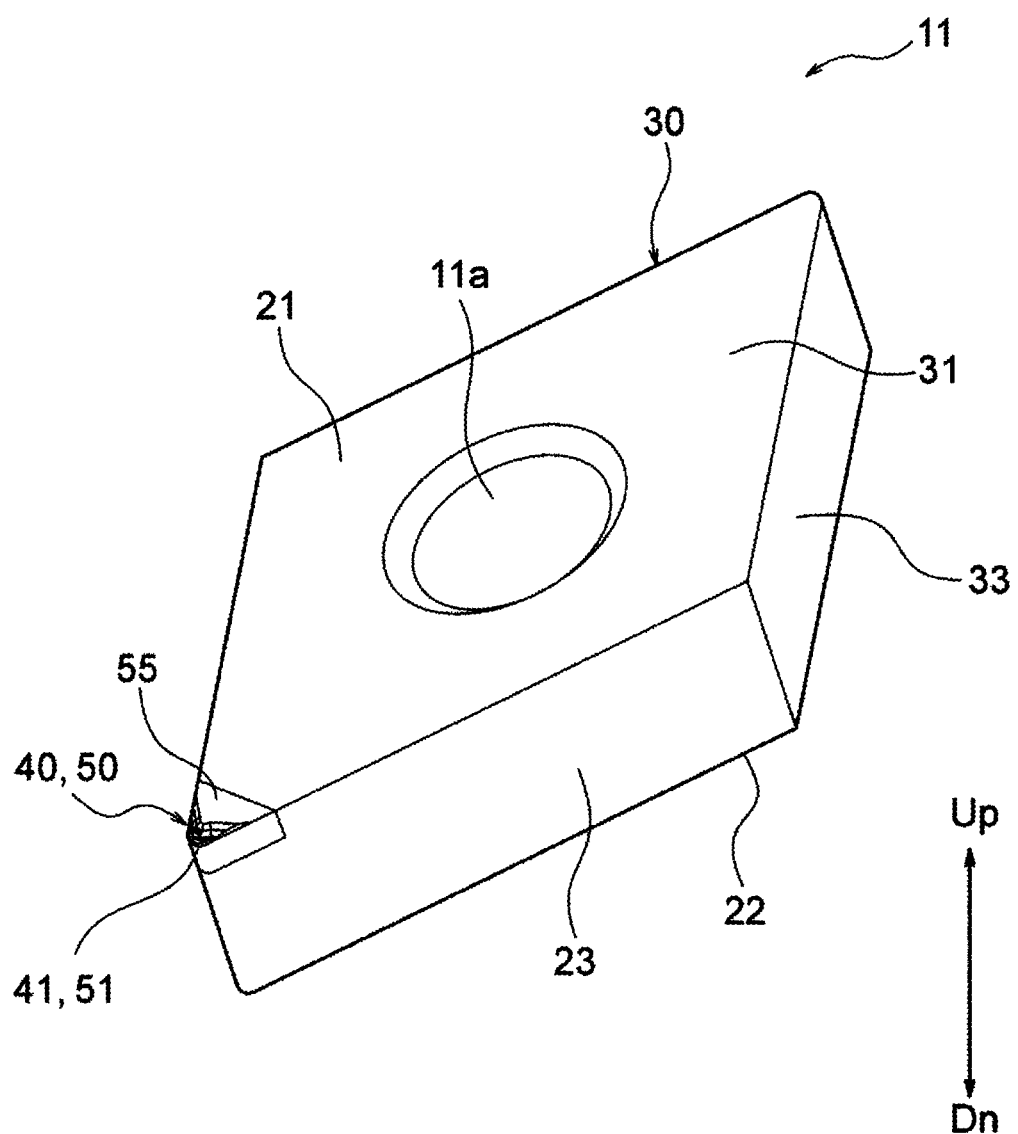
FIG. 3 is a perspective view of an insert illustrated in FIG. 2.

Reference may be made to FIGS. 2 and 3. The insert 11 may include a main portion 30 and a cutting portion 40. The main portion 30 may constitute, for example, a major portion of the insert 11. When the main portion 30 constitutes a major portion of the insert 11, the above description of the shape and size of the insert 11 may be applied to the shape and size of the main portion 30. The main portion 30 may be urged against the holder 70 by the clamp 13.

Figure 4:
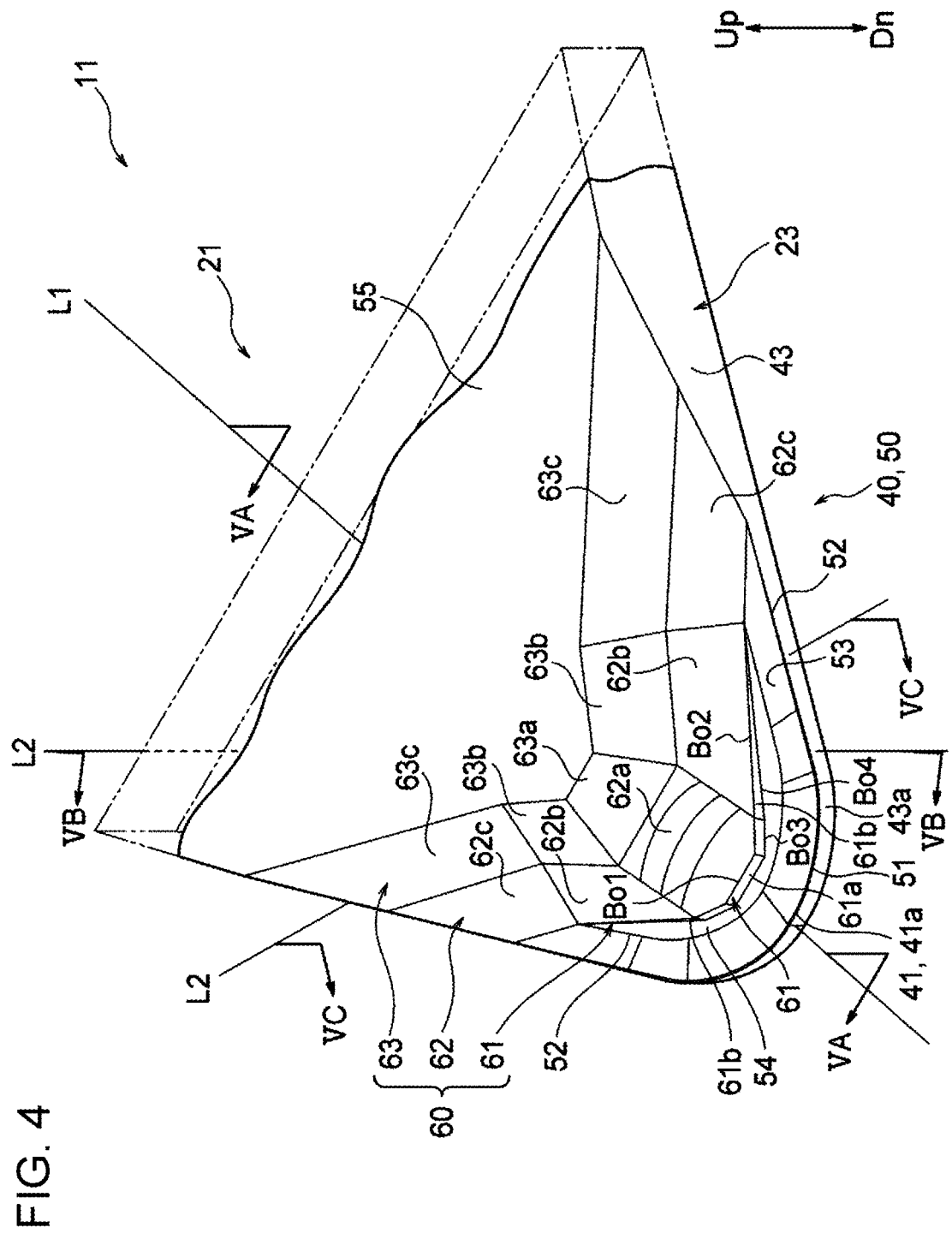
FIG. 4 is an enlarged view of a cutting portion of the insert illustrated in FIG. 3.

Reference may be made to FIGS. 3 and 4. The cutting portion 40 may be a portion capable of cutting the workpiece Ob (see FIG. 1). The cutting portion 40 may be positioned at, for example, a corner of the main portion 30 having a polygonal shape (rectangular shape in FIG. 3) in a plan view. The cutting portion 40 may have an edge portion 41 that faces outward. The edge portion 41 of the cutting portion 40 may be capable of coming into contact with the workpiece Ob (see FIG. 1) and cutting the workpiece Ob when the insert 11 is fixed to the holder 70. The edge portion 41 may have a cutting edge 41a, a rake face 53, and a flank face 43a, which will be described below.

Reference may be made to FIG. 3. The material of the cutting portion 40 may be the same as the material of the main portion 30 or different from the material of the main portion 30. In one embodiment, the cutting portion 40 may be made of a CBN, and the main portion 30 may be made of a cemented carbide. In another embodiment, the cutting portion 40 may be made of a PCD, and the main portion 30 may be made of a cemented carbide. In still another embodiment, the cutting portion 40 and the main portion 30 may be made of a cemented carbide. The materials of the main portion 30 and the cutting portion 40 may be materials in any combination. The cutting portion 40 may have a color that is the same as the color of the main portion 30 or different from the color of the main portion 30.

The insert 11 illustrated in FIG. 3 may include only one cutting portion 40. However, the insert 11 may instead include two cutting portions 40 or three or more cutting portions 40. In one embodiment, the insert 11 may be rectangular plate-shaped and have a cutting portion at each of four corners thereof (four cutting portions in total). In another embodiment, the insert 11 may be triangular plate-shaped and have a cutting portion at each of three corners thereof (three cutting portions in total). In still another embodiment, the insert 11 may be pentagonal plate-shaped and have a cutting portion at each of five corners thereof (five cutting portions in total).

The insert 11 may have an upper surface 21, a lower surface 22, and a lateral surface 23. In addition, the insert 11 may have a through hole 11a that opens in the upper surface 21 and the lower surface 22. The upper surface 21 and the lateral surface 23 form the edge portion 41 of the insert 11. The edge portion 41 may come into contact with the workpiece Ob (see FIG. 1) and cuts the workpiece Ob.

(Upper Surface)

Reference may be made to FIGS. 2 and 3. The upper surface 21 may be an upwardly facing surface of the main portion 30 and the cutting portion 40. The upper surface 21 may be a surface that comes into contact with the clamp 13 when the insert 11 is fixed to the holder 70.

The upper surface 21 may have, for example, a rectangular shape (including a rhomboid shape), a triangular shape, or a pentagonal shape. The upper surface 21 may be either parallel or not parallel to the lower surface 22. At least a portion of the upper surface 21 may have irregularities.

Reference may be made to FIGS. 3 and 4. As illustrated in FIG. 3, the upper surface 21 may include a main-portion upper surface 31 and a cutting-portion upper surface 50. The main-portion upper surface 31 may be an upwardly facing surface of the main portion 30.

(Cutting-Portion Upper Surface)

The cutting-portion upper surface 50 may be an upwardly facing surface of the cutting portion 40. The main-portion upper surface 31 may either be smooth over the entire area thereof or include regions with irregularities.

The percentage of the cutting-portion upper surface 50 in the upper surface 21 may be 3% or less, 7% or less, 15% or less, or 15% or more. The cutting-portion upper surface 50 may have any shape. For example, the cutting-portion upper surface 50 may have a triangular shape, a rectangular shape, or a substantially V-shape (including a U-shape).

Reference may be made to FIG. 4. The cutting-portion upper surface 50 may include a corner portion 51 that defines a corner of the cutting-portion upper surface 50, side portions 52 and 52 connected to the corner portion 51, a rake face 53 extending along the corner portion 51 and the side portions 52 and 52, a joining face 54 connected to the rake face 53, a rising face 60 connected to the joining face 54 and extending upward with increasing distance from the rake face 53, and a connecting face 55 that connects the rising face 60 to the main-portion upper surface 31.

(Corner Portion)

The corner portion 51 may be positioned at a boundary between the cutting-portion upper surface 50 and the lateral surface 23. The corner portion 51 may have the shape of an outwardly bulging line (convexly curved line) in the plan view. The corner portion 51 having the shape of a convexly curved line may extend diagonally upward, horizontally, or diagonally downward in directions from the apex of the convex curve toward the side portions 52 and 52. The above-described convexly curved line is not limited to a convexly curved line having no thickness, and may instead have a predetermined thickness. The corner portion 51 having the shape of a convexly curved line may have any curvature.

(Side Portions)

The side portions 52 and 52 may each be connected to the corner portion 51 and extend from the corner portion 51 toward the rising face 60. The ends of the side portions 52 and 52 distant from the corner portion 51 may be connected to the rising face 60 (second rising face 62).

One side portion 52 may be positioned to the right of the corner portion 51 when viewed from the front of the corner portion 51. The other side portion 52 may be positioned to the left of the corner portion 51 when viewed in the same direction. One side portion 52 and the other side portion 52 may be separated from each other.

The side portions 52 and 52 may each have the shape of a line (straight line) that extends from the corner portion 51 toward the main-portion upper surface 31. In another respect, the side portions 52 and 52 may each be a portion having the shape of a straight line extending along an outer edge of the cutting-portion upper surface 50. The straight line referred to herein does not necessarily mean a strictly straight line. For example, assuming that there is a straight line extending along one side portion 52, when the gap between the side portion 52 and the straight line is 0.05 mm or less or 0.03 mm or less, the side portion 52 may be regarded as having the shape of a straight line. Straight lines referred to in other descriptions may also have the same meaning. In addition, the straight line is not limited to a straight line having no thickness, and may include a line having a predetermined thickness and extending straight.

Reference may be made to FIGS. 3 and 4. The side portions 52 and 52 may extend diagonally upward, horizontally, or diagonally downward from the corner portion 51 toward the main-portion upper surface 31 (connecting face 55). One side portion 52 and the other side portion 52 may have the same inclination angle or different inclination angles. For example, one side portion 52 may have an upward inclination angle, and the other side portion 52 may have a downward inclination angle.

The side portions 52 and 52 may have any lengths. For example, the side portions 52 and 52 may have either the same length or different lengths. The side portions 52 and 52 may each be longer than the corner portion 51 or shorter than the corner portion 51. The side portions 52 and 52 may have the same length as that of the corner portion 51.

The corner portion 51 and the side portions 52 and 52 may face toward the outside of the insert 11. The corner portion 51 and the side portions 52 and 52 may form the cutting edge 41a that directly contributes to cutting of the workpiece Ob (see FIG. 1). The cutting edge 41a may be a part of the edge portion 41. For example, the cutting edge 41a may be a part of the insert 11 that bites into the workpiece Ob when the workpiece Ob is cut. The cutting edge 41a may be a ridge between the cutting-portion upper surface 50 and the lateral surface 23.

(Rake Face)

Reference may be made to FIGS. 4 and 5. The rake face 53 may be connected to the side portions 52 and 52 and the corner portion 51. In other words, the rake face 53 may be connected to the cutting edge 41a. The rake face 53 may extend along the side portions 52 and 52 and the corner portion 51.

The rake face 53 may be inclined downward (toward the lower surface 22) from the side portions 52 and 52 and the corner portion 51. The rake face 53 may have any inclination angle. For example, the inclination angle of the rake face 53 may be 10 degrees or less, 25 degrees or less, or 25 degrees or more. The inclination angle of the rake face 53 may differ at different locations on the rake face 53 along the corner portion 51 and the side portions 52 and 52. The lower side (lower edge) of the downwardly inclined rake face 53 may be either curved or not curved. The lower side of the rake face 53 may include a straight portion.

The rake face 53 may have any shape in the plan view. For example, as in the example illustrated in FIG. 4, the rake face 53 may have a substantially V-shape (including a substantially U-shape) in the plan view. A portion or the entirety of the rake face 53 may be flat, convexly curved, or concavely curved. The rake face 53 may have any width in a direction along the side portions 52 and 52 and the corner portion 51.

(Joining Face)

The joining face 54 illustrated in FIG. 4 may connect the rake face 53 to the rising face 60. In the illustrated example, the joining face 54 may be connected to the lower side of the rake face 53 and the lower side of the rising face 60.

The joining face 54 may have a predetermined width in a direction from the rake face 53 toward the rising face 60 (direction orthogonal to the line-shaped corner portion 51 in the plan view). The width of the joining face 54 may either be constant or vary along the rake face 53 and the rising face 60.

For example, as illustrated in FIG. 4, the width of the joining face 54 may be greater at a location on a straight line L1 that bisects the corner portion 51 (hereinafter referred to as a straight line L1) than at a location farthest from the corner portion 51. For example, the joining face 54 may have a constant width in a region along the corner portion 51 (in a region connected to a portion of the rake face 53 that extends along the corner portion 51). The width of the joining face 54 may differ at different locations in regions along the side portions 52 and 52 (regions connected to portions of the rake face 53 that extend along the side portions 52 and 52). Here, the term "constant" may mean that, for example, the above-described width of the joining face 54 does not vary by 0.03 mm or more along the rake face 53. The joining face 54 may have a width that decreases with increasing distance from the corner portion 51 in regions along portions of the rake face 53 connected to the side portions 52 and 52.

The joining face 54 may have any shape in the plan view. For example, the joining face 54 may have a substantially V-shape (including a substantially U-shape) in the plan view. In addition, the joining face 54 may have either a predetermined inclination angle or no inclination angle in the width direction. In other words, the joining face 54 may be inclined upward, inclined downward, or not inclined in the width direction.

(Rising Face)

As described above, the rising face 60 may be connected to the joining face 54 and the connecting face 55. The rising face 60 extends upward with increasing distance from the rake face 53. The lower side of the rising face 60 may be connected to the joining face 54. The upper side of the rising face 60 may be connected to the connecting face 55. The upper side and the lower side may each include a portion having the shape of a straight line and a portion having the shape of a curved line in a side view and/or the plan view. This also applies to upper and lower sides of elements described below.

In the example illustrated in FIG. 4, the rising face 60 may include a first rising face 61, a second rising face 62, and a third rising face 63. The first rising face 61 may be connected to the joining face 54 and the second rising face 62. The third rising face 63 may be connected to the second rising face 62 and the connecting face 55. The second rising face 62 may be positioned between the first rising face 61 and the third rising face 63. The first to third rising faces 61, 62, and 63 will now be described.

(First Rising Face)

The first rising face 61 may be separated from the cutting edge 41a with the rake face 53 and the joining face 54 disposed therebetween. The first rising face 61 may extend upward with increasing distance from the cutting edge 41a. In other words, the first rising face 61 may be inclined upward in a direction from the joining face 54 toward the second rising face 62. When the first rising face 61 is inclined upward, the insert 11 may have a groove defined by the rake face 53, the joining face 54, and the first rising face 61. This groove may have, for example, a flat bottom face.

The first rising face 61 may have a first region 61a and second regions 61b and 61b. The first region 61a may be connected to a portion of the joining face 54 that extends along the corner portion 51. In another respect, the first region 61a may extend along the corner portion 51. The second regions 61b and 61b may be connected to portions of the joining face 54 that extend along the side portions 52 and 52. In another respect, the second regions 61b and 61b may extend along the side portions 52 and 52. The first region 61a and the second regions 61b and 61b may be connected to each other. The first region 61a and the second regions 61b and 61b will now be described in detail.

(First Region)

Figure 5A:
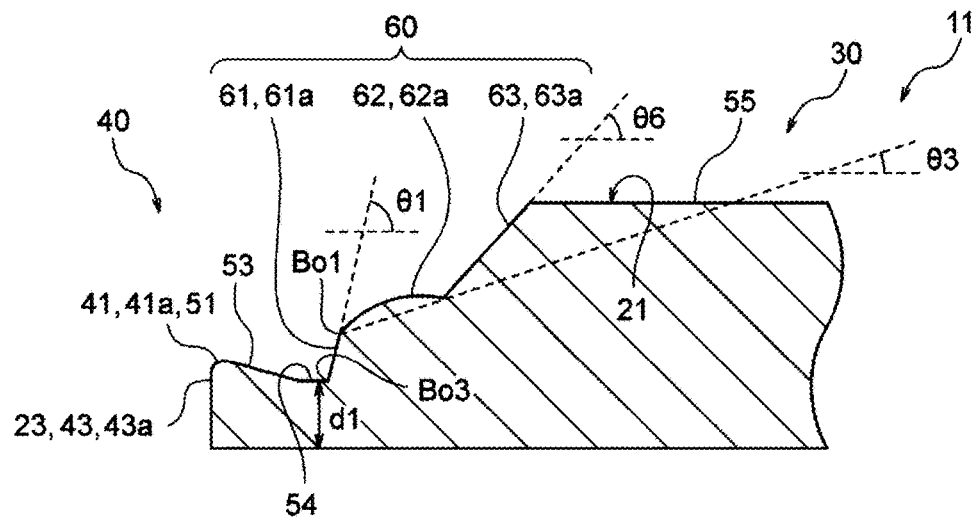
FIG. 5A is a sectional view of FIG. 4 taken along line VA-VA.

Reference may be made to FIGS. 4 and 5A. In one embodiment, the first region 61a may be a straight line extending from the joining face 54 to the second rising face 62 in a sectional view taken along the straight line L1 that bisects the corner portion 51. In another embodiment, the first region 61a may be a curved line extending from the joining face 54 to the second rising face 62 in a sectional view taken along the straight line L1. As described above, the straight line mentioned above does not necessarily mean a strictly straight line. The curved line may be either convex or concave.

The first region 61a may have an upward inclination angle in a direction from the joining face 54 toward the second rising face 62. When the inclination angle of the first region 61a is θ1, θ1 may be, for example, 80 degrees or more and 90 degrees or less, 65 degrees or more and 80 degrees or less, 45 degrees or more and 65 degrees or less, or more than 0 degrees and less than 45 degrees.

The inclination angle θ1 may be determined by, for example, measuring an angle by which the first region 61a is inclined on a cross section of the insert 11 taken along the straight line L1. When the first region 61a is curved, the inclination angle θ1 of the first region 61a may be determined by, for example, measuring an inclination angle of a straight line connecting the lower side and the upper side of the first region 61a on the cross section of the insert 11 taken along the bisector of the corner portion 51. An inclination angle of a third region 62a, which will be described below, may also be determined by the same method.

Figure 6A:
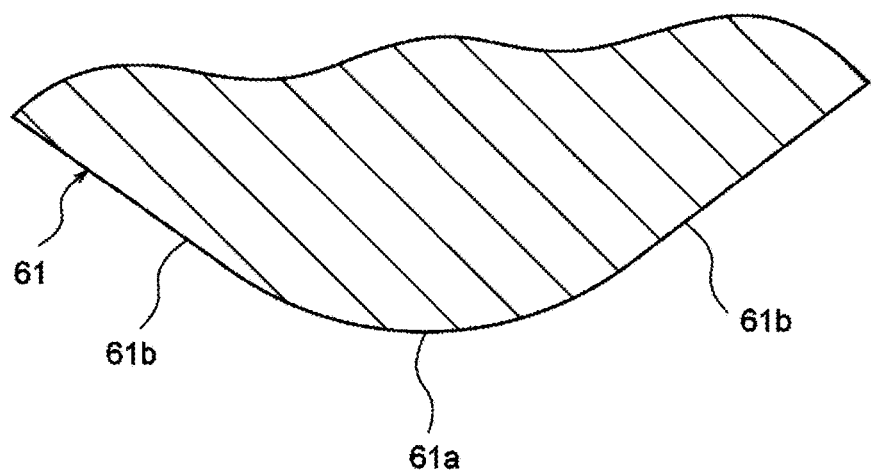
FIG. 6A is a partial sectional view of the insert taken in a horizontal direction and including a first rising face.

Reference may be made to also to FIG. 6A. The first region 61a may be convexly curved outward (toward the cutting edge 41a) in a see-through plan view (sectional view taken in a horizontal direction). In the sectional view taken in a horizontal direction, the first region 61a may have a curved line that is curved along the corner portion 51. The first region 61a may have the curved line over the entire range thereof, in a central portion thereof, or at a location separated from the central portion thereof in the up-down direction. The first region 61a may instead be formed such that the first region 61a includes no curved line in the sectional view taken in a horizontal direction. The first region 61a may have any size and shape.

(Second Regions)

Reference may be made to FIG. 4. The second regions 61b and 61b may have any size. For example, the second regions 61b and 61b may be larger than the first region 61a, have the same as the first region 61a, or be smaller than the first region 61a.

One second region 61b may be positioned to the right of the first region 61a when viewed from the front of the center of the corner portion 51. The other second region 61b may be positioned to the left of the first region 61a when viewed in the same direction. The size of one second region 61b may be the same as that of the other second region 61b or different from that of the other second region 61b.

Figure 5B:
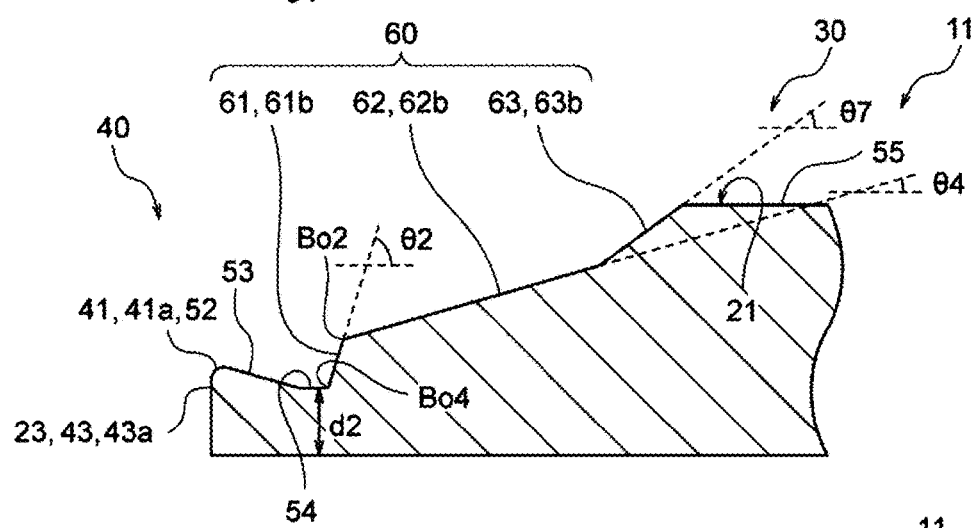
FIG. 5B is a sectional view of FIG. 4 taken along line VB-VB.
Figure 5C:
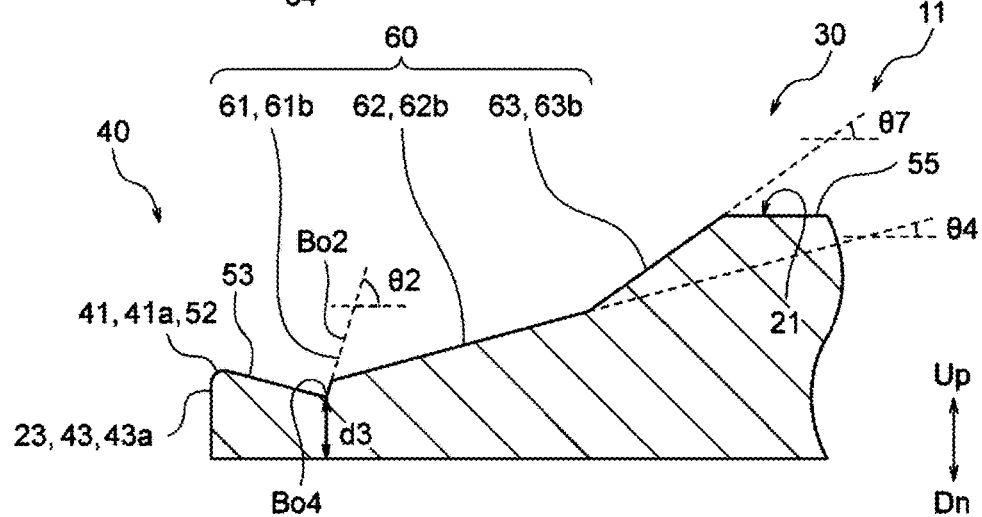
FIG. 5C is a sectional view of FIG. 4 taken along line VC-VC.

Reference may be made to FIGS. 5B and 5C. In one embodiment, the second regions 61b and 61b may have the shape of a straight line extending from the joining face 54 to the second rising face 62 in sectional views taken along straight lines L2 (see FIG. 4) extending in horizontal directions orthogonal to the side portions 52 and 52. In another embodiment, the second regions 61b and 61b may have the shape of a curved line that extends from the joining face 54 to the second rising face 62 in the sectional views taken along the straight lines L2. The curve may be either outwardly convex or concave. The second regions 61b and 61b may have upward inclination angles in a direction from the joining face 54 toward the second rising face 62.

When the inclination angles of the second regions 61b and 61b are θ2 and θ2 (FIGS. 5B and 5C each show only the inclination angle θ2 of one second region 61b), θ2 and θ2 may be, for example, 60 degrees or more and 90 degrees or less, 35 degrees or more and 60 degrees or less, or more than 0 degrees and less than 45 degrees. The inclination angles θ2 and θ2 of the second regions 61b and 61b may be determined by measuring the inclination angles on cross sections taken along the straight lines L2. When the second regions 61b and 61b are curved, the inclination angles θ2 and θ2 may be determined by, for example, measuring the inclination angles θ2 and θ2 of straight lines connecting the lower sides and the upper sides of the second regions 61b and 61b. Inclination angles θ4 and θ4 of fourth regions 62b and 62b, which will be described below, may also be determined by the same method.

The inclination angles θ2 and θ2 of the second regions 61b and 61b may be equal to the inclination angle θ1 of the first region 61a or different from the inclination angle of the first region 61a. In the latter case, either may be greater than the other. The inclination angles θ2 and θ2 of the second regions 61b and 61b may be equal to each other or different from each other.

(Second Rising Face)

Reference may be made to FIG. 4. The second rising face 62 may extend upward with increasing distance from the cutting edge 41a. In other words, the second rising face 62 may be inclined upward in a direction from the first rising face 61 toward the third rising face 63.

The second rising face 62 may include a third region 62a, fourth regions 62b and 62b, and fifth regions 62c and 62c. The third region 62a may be connected to a portion of the first rising face 61 that extends along the corner portion 51. The fourth regions 62b and 62b may be connected to portions of the first rising face 61 that extend along the side portions 52 and 52. The fifth regions 62c and 62c may be connected to the fourth regions 62b and 62b.

(Third Region)

The third region 62a may extend along the corner portion 51. The third region 62a may have a lower side connected to the first region 61a and an upper side connected to the third rising face 63.

The third region 62a may have any size. For example, the size of the third region 62a may be larger than, equal to, or smaller than that of the first region 61a. In the example illustrated in FIG. 4, the third region 62a may be larger than the first region 61a.

Reference may be made to FIGS. 4 and 5A. In one embodiment, the third region 62a may have the shape of a straight line extending from the first region 61a to the third rising face 63 in the sectional view taken along the straight line L1 that bisects the corner portion 51. However, in FIG. 5A, the third region 62a may have the shape of a curved line extending from the first region 61a to the third rising face 63 in the sectional view taken along the straight line L1. The thus-curved third region 62a may be, for example, outwardly (diagonally upwardly) convex (or concave) in the sectional view taken along the straight line L1.

Figure 6B:
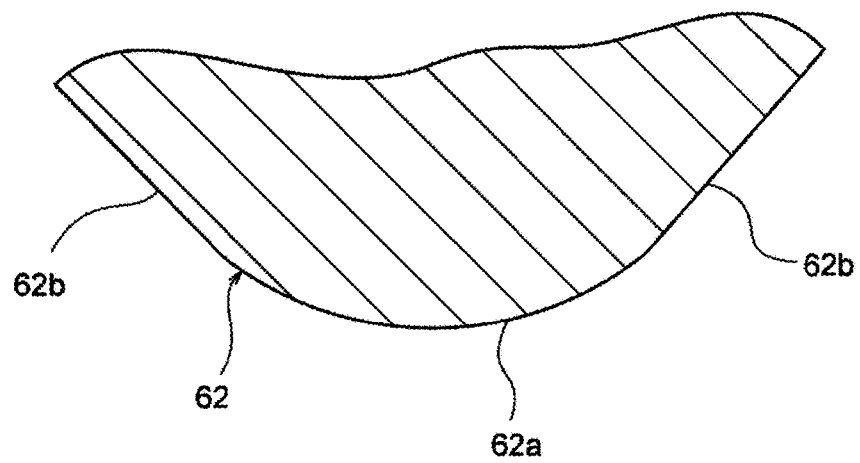
FIG. 6B is a partial sectional view of the insert taken in a horizontal direction and including a second rising face.

Reference may be made to FIG. 6B. As illustrated in FIG. 6B, the third region 62a may be curved convexly toward the corner portion 51 in a sectional view taken in a horizontal direction and including the third region 62a.

Reference may be made to FIGS. 4 and 5A. The third region 62a may have an upward inclination angle in a direction from the first region 61a toward the connecting face 55. When the inclination angle of the third region 62a is θ3, the inclination angle θ3 may be, for example, 45 degrees or more and 90 degrees or less, 25 degrees or more and 90 degrees or less, or more than 0 degrees and less than 25 degrees. The inclination angle θ3 may be, for example, less than the inclination angle θ1 of the first region 61a.

The third region 62a may have any shape. For example, the third region 62a may be substantially rectangular or trapezoidal overall.

When the boundary between the first region 61a and the third region 62a is a first boundary Bo1, at least a portion of the first boundary Bo1 may be positioned above the cutting edge 41a (corner portion 51). For example, the entirety of first boundary Bo1 may be positioned above the cutting edge 41a. The first boundary Bo1 may be curved convexly toward the cutting edge 41a in the plan view. The first boundary Bo1 may include a portion that extends along the corner portion 51.

(Fourth Regions)

The fourth regions 62b and 62b may extend along the side portions 52 and 52. As illustrated in FIG. 4, the fourth regions 62b and 62b may have lower sides connected to the second regions 61b and 61b and upper sides connected to the third rising face 63.

The fourth regions 62b and 62b may each have any size and shape. For example, the sizes of the fourth regions 62b and 62b may be larger than, equal to, or smaller than those of the second regions 61b and 61b. The fourth regions 62b and 62b may have, for example, a rectangular or trapezoidal shape.

The fourth regions 62b and 62b may extend straight or be curved from the second regions 61b and 61b to the third rising face 63. The curve may be either outwardly convex or concave. When the inclination angle of each of the fourth regions 62b and 62b is θ4, the inclination angles θ4 and θ4 may be, for example, 45 degrees or more and 90 degrees or less, 25 degrees or more and 90 degrees or less, or more than 0 degrees and less than 25 degrees. The inclination angles θ4 and θ4 (FIGS. 5B and 5C each show only the inclination angle θ4 of one fourth region 62b) may be less than the inclination angles θ2 and θ2 of the second regions 61b and 61b.

When the boundaries between the second regions 61b and 61b and the fourth regions 62b and 62b are second boundaries Bo2 and Bo2, at least portions of the second boundaries Bo2 and Bo2 may be positioned below the cutting edge 41a in the side view. In one embodiment, portions of the second boundaries Bo2 and Bo2 that are farthest from the first boundary Bo1 may be positioned below the cutting edge 41a, and portions of the second boundaries Bo2 and Bo2 that are closest to the first boundary Bo1 may be positioned above the cutting edge 41a.

The second boundaries Bo2 and Bo2 may be inclined downward in directions away from the first boundary Bo1. The second boundaries Bo2 and Bo2 may have the shapes of lines extending along the side portions 52 and 52. The second boundaries Bo2 and Bo2 may have the shapes of, for example, straight lines or curved lines. The second boundaries Bo2 and Bo2 may include portions that extend along the side portions 52 and 52.

(Fifth Regions)

The fifth regions 62c and 62c may extend from the fourth regions 62b and 62b to the outer edge of the cutting-portion upper surface 50. The fifth regions 62c and 62c may have any size and shape. In one embodiment, the sizes of the fifth regions 62c and 62c may be larger than those of the second regions 61b and 61b. The sizes of the fifth regions 62c and 62c may be larger than, smaller than, or equal to those of the fourth regions 62b and 62b. The fifth regions 62c and 62c may have, for example, a rectangular or trapezoidal shape.

The fifth regions 62c and 62c may be inclined upward in a direction from the rake face 53 toward the third rising face 63. The inclined fifth regions 62c and 62c may extend straight or be curved from the rake face 53 to the third rising face 63. The curve may be either outwardly concave or convex. When the inclination angle of each of the fifth regions 62c and 62c is θ5, the inclination angles θ5 and θ5 may, for example, be greater than, less than, or equal to the inclination angles θ4 and θ4 of the fourth regions 62b and 62b.

(Third Rising Face)

The third rising face 63 may extend upward with increasing distance from the cutting edge 41a. In other words, the third rising face 63 may be inclined upward in a direction from the second rising face 61 toward the main-portion upper surface 31.

The third rising face 63 may include a sixth region 63a, seventh regions 63b and 63b, and eighth regions 63c and 63c. The sixth region 63a may be connected to a portion of the second rising face 62 that extends along the corner portion 51 (third region 62a). The seventh regions 63b and 63b may be connected to portions of the second rising face 62 that extend along the side portions 52 and 52 (fourth regions 62b and 62b). The eighth regions 63c and 63c may be connected to the seventh regions 63b and 63b and extend from the seventh regions 63b and 63b to the outer edge of the insert 11.

(Sixth Region)

The sixth region 63a may extend along the corner portion 51. As illustrated in FIG. 4, the sixth region 63a may have a lower side connected to the third region 62a and an upper side connected to the connecting face 55. The description of the size and shape of the third region 62a may be applied to the size and shape of the sixth region 63a.

The sixth region 63a may be either curved or not curved. When the inclination angle of the sixth region 63a is θ6, the inclination angle θ6 may, for example, be less than, greater than, or equal to the inclination angle θ3 of the third region 62a.

(Seventh Regions)

The seventh regions 63b and 63b may extend along the side portions 52 and 52. As illustrated in FIG. 4, the seventh regions 63b and 63b may have lower sides connected to the fourth regions 62b and 62b and upper sides connected to the connecting face 55. The description of the sizes and shapes of the fourth regions 62b and 62b may be applied to the sizes and shapes of the seventh regions 63b and 63b.

The seventh regions 63b and 63b may be either curved or not curved. When the inclination angle of each seventh region 63b is θ7 (FIGS. 5B and 5C each show only the inclination angle θ7 of one seventh region 63b), the inclination angles θ7 and θ7 may, for example, be less than, greater than, or equal to the inclination angles θ4 and θ4 of the fourth regions 62b and 62b.

(Eighth Regions)

The eighth regions 63c and 63c may connect the fifth regions 62c and 62c to the connecting face 55. The description of the size and shape of the fifth regions 62c and 62c may be applied to the size and shape of the eighth regions 63c and 63c.

The eighth regions 63c and 63c may be either curved or not curved. When the inclination angle of each of the eighth regions 63c and 63c is θ8 (not illustrated), the inclination angles θ8 and θ8 may be greater than, less than, or equal to the inclination angles θ5 and θ5 of the fifth regions 62c and 62c.

The first region 61a, the third region 62a, and the sixth region 63a may include portions positioned on the straight line L1 extending along the bisector of the corner portion 51 in the plan view. The second regions 61b and 61b, the fourth regions 62b and 62b, and the seventh regions 63b and 63b may include portions positioned on the straight lines L2 extending in horizontal directions orthogonal to the side portions 52 and 52.

The upper side and the lower side of each of the first region 61a, the third region 62a, and the sixth region 63a may each have the shape of, for example, a curved line. The upper sides and the lower sides of the second regions 61b and 61b, the fourth and fifth regions 62b, 62b, 62c, and 62c, and the seventh and eighth regions 63b, 63b, 63c, and 63c may each have the shape of, for example, a straight line.

(Connecting Face)

The size of the connecting face 55 may be larger than, smaller than, or equal to that of a portion of the cutting-portion upper surface 50 excluding the connecting face 55 in the plan view. The connecting face 55 may be the uppermost one of the faces that constitute the cutting-portion upper surface 50.

(Lower Surface)

Reference may be made also to FIG. 3. As described above, the lower surface 22 of the insert 11 may be positioned at a side opposite to a side at which the upper surface 21 is positioned. The lower surface 22 may be a surface that faces the holder 70 when the insert 11 is fixed to the holder 70 (see FIG. 2). In this state, the lower surface 22 may be in contact with the holder 70. The description of the shape of the upper surface 21 may be applied to the shape of the lower surface 22.

In the example illustrated in FIG. 4, a distance d1 (FIG. 5A) from the lower side (lower edge) of the first region 61a to the lower surface 22 in the vertical direction may be constant along the lower side of the first region 61a. Here, the term "constant" may mean that, for example, the above-described distance does not vary by 0.05 mm or more along the lower side of the first region 61a. The entirety of the boundary between the first region 61a and the joining face 54 (referred to also as a third boundary Bo3) may extend horizontally. The above-described third boundary Bo3 may be the lower side of the first region 61a. In FIGS. 5A to 5C, the distance d1 and distances d2 and d3 described below may be shorter than those in FIG. 3 for convenience.

Reference may be made to FIGS. 5B and 5C. The distance from the lower sides (lower edges) of the second regions 61b and 61b to the lower surface 22 (see FIG. 3) in the vertical direction may decrease with increasing distance from the first region 61a. As illustrated in FIG. 5B, d2 may be the distance from the second regions 61b and 61b to the lower surface 22 at a location close to the first region 61a. As illustrated in FIG. 5C, d3 may be the distance from the second regions 61b and 61b to the lower surface 22 at a location distant from the first region 61a. In this case, the distances may satisfy d2>d3. The lower sides of the second regions 61b and 61b may be inclined downward in directions away from the first region 61a. The inclination angle of the lower sides may be, for example, 3 degrees or less, 10 degrees or less, 20 degrees or less, or 20 degrees or more. The lower sides of the second regions 61b and 61b may define the boundaries between the second regions 61b and 61b and the joining face 54, and may each be referred to as a fourth boundary Bo4.

(Lateral Surface)

Reference may be made to FIG. 3. The lateral surface 23 may be positioned between the upper surface 21 and the lower surface 22. The lateral surface 23 may be a surface that connects the upper surface 21 and the lower surface 22. The lateral surface 23 may bulge outward, be recessed inward, or have no curvature. In addition, the lateral surface 23 may either be smooth over the entire area thereof or include regions with irregularities.

Reference may be made to FIGS. 3 and 4. The lateral surface 23 may include a main-portion lateral surface 33 and a cutting-portion lateral surface 43. The main-portion lateral surface 33 may be a portion constituting the lateral surface of the main portion 30. The cutting-portion lateral surface 43 may be the remaining portion constituting the lateral surface of the cutting portion 40. The cutting-portion lateral surface 43 may be connected to the main-portion lateral surface 33.

The cutting-portion lateral surface 43 may include the flank face 43a of the edge portion 41. The flank face 43a may be connected to the rake face 53, and intersects the rake face 53 at a predetermined angle so that the insert 11 does not come into contact with the workpiece Ob more than necessary. The cutting edge 41a may be positioned at the boundary between the flank face 43a and the rake face 53. In other words, the cutting edge 41a may include the ridge between the flank face 43a and the rake face 53.

The holder of the above-described cutting tool will now be described. The holder in a state such that the insert is fixed thereto will be referred to and described.

(Holder)

Reference may be made to FIG. 2. The holder 70 may have a length such that the holder 70 extends, for example, from the distal end 70a (first end 70a) to a proximal end 70b (hereinafter referred to also as a second end 70b). As illustrated, the holder 70 may be rod-shaped. The holder 70 may have any length. For example, the length of the holder 70 may be set in the range of 50 mm or more and 200 mm or less.

The holder 70 may have any size. For example, the width (left-right direction) and the thickness (up-down direction) of the holder 70 may be 10 mm or more, 19 mm or more, 25 mm or more, or 50 mm or more. The width and the thickness of the holder 70 may be equal to each other or different from each other. The holder 70 may have a thickness that increases toward the distal end 70a.

The holder 70 may be made of any material. For example, the material of the holder 70 may be steel or cast iron. The holder 70 made of cast iron, for example, may have high flexibility and toughness.

The holder 70 may include a shank portion 71 and a fixing portion 72. The shank portion 71 may constitute a portion of the holder 70 including the second end 70b. The shank portion 71 may, for example, be a solid body having a solid interior. The shank portion 71 may have any shape.

For example, the shank portion 71 may be rectangular or circular in cross section along a plane perpendicular to the direction in which the shank portion 71 extends. As illustrated in FIG. 2, the shank portion 71 may have a first face 71a, a second face 71b, a third face 71c, and a fourth face 71d.

The first face 71a may face in a direction in which the flank face 43a of the insert 11 faces. The second face 71b may be positioned at a side opposite to a side at which the first face 71a is positioned. The third face 71c may connect the first face 71a and the second face 71b and face in a direction in which the rake face 53 faces. The fourth face 71d may connect the first face 71a and the second face 71b and be positioned at a side opposite to a side at which the third face 71c is positioned. The first face to the fourth face 71d may constitute a surface of the shank portion 71 that connects the second end 70b and the fixing portion 72.

The fixing portion 72 may be positioned at the first end 70a of the holder 70. The insert 11 capable of cutting the workpiece Ob may be fixed to the fixing portion 72. For example, the insert 11 may be fitted to the pocket 72a, which is a recess formed in the fixing portion 72. The insert 11 may be fixed by being urged downward by the clamp 13. In addition, a distal end of the clamp 13 that urges the insert 11 against the holder 70 may be inserted in the through hole 11a formed in the insert 11. The insert 11 may be fixed to the holder 70 by being clamped between the bottom face of the pocket 72a and the clamp 13. As in the example illustrated in FIG. 2, the clamp 13 may be fixed with a screw that is screwed into the holder 70. The fixing portion 72 may constitute a portion of the holder 70 including the first end 70a.

A method for cutting the workpiece with the cutting tool will now be described.

Figure 7:
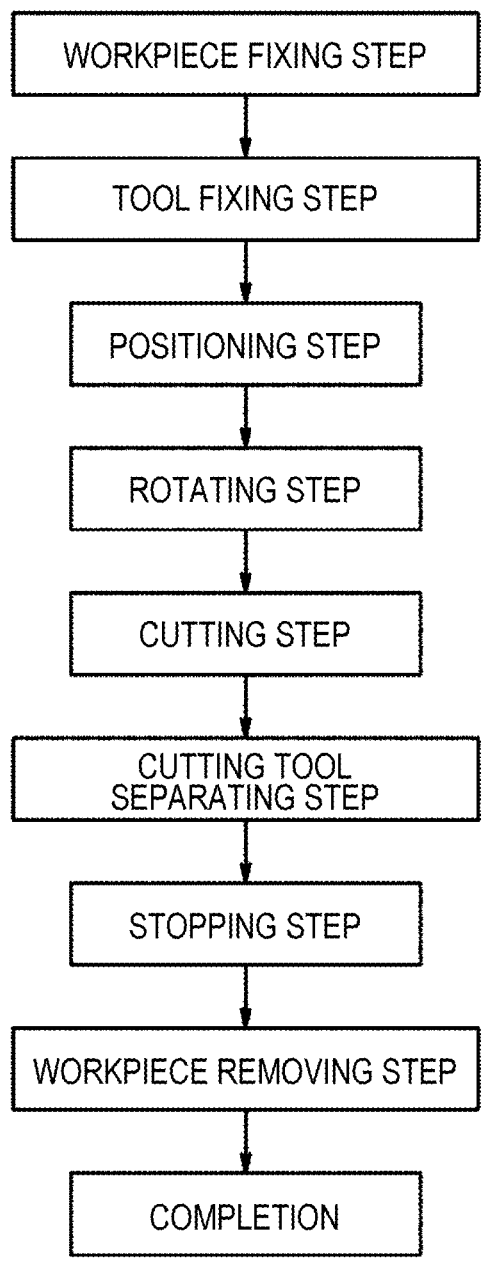
FIG. 7 illustrates a method for cutting a workpiece using the cutting tool illustrated in FIG. 2.

Reference may be made to FIG. 7. FIG. 7 may illustrate the steps of the method for cutting the workpiece. The method for cutting a workpiece may, for example, start with a step of attaching the workpiece Ob to the machine tool Mt (workpiece fixing step). After that, for example, the cutting tool 10 may be attached to the machine tool Mt (for example, to a tool post) (tool fixing step). The workpiece fixing step may, for example, instead be performed after completion of the tool fixing step.

When the workpiece Ob and the cutting tool 10 are fixed to the machine tool Mt, positioning of the cutting tool 10 (insert 11) may be performed (positioning step). For example, the size and/or the shape of the workpiece Ob and the positional relationship between the workpiece Ob and the cutting tool 10 may be determined. The positioning step may be performed manually (through visual observation) or automatically. Next, the workpiece Ob may be rotated by the machine tool Mt (rotating step). While the workpiece Ob is being rotated, the cutting tool 10 may be brought into contact with the workpiece Ob by the machine tool Mt (cutting step). More specifically, the cutting portion 40 of the insert 11 may be brought into contact with the workpiece Ob. Thus, the workpiece Ob may be cut into a desired size and shape.

After the workpiece Ob is cut into the desired size and shape, the cutting tool 10 may be separated from the workpiece Ob (cutting tool separating step). After that, the rotation of the workpiece Ob may be stopped (stopping step), and the workpiece Ob may be removed from the machine tool Mt (workpiece removing step). Thus, the workpiece Ob that has been cut may be obtained.

The operation of the insert according to the present disclosure will now be described.

Figure 8A:
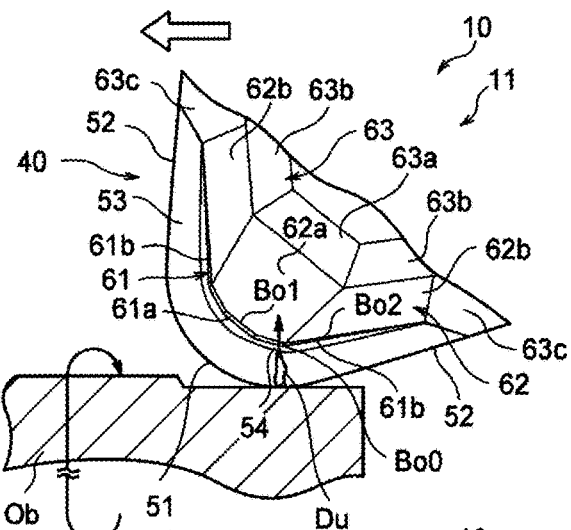
FIG. 8A illustrates a workpiece that is being cut to a small depth.
Figure 8B:
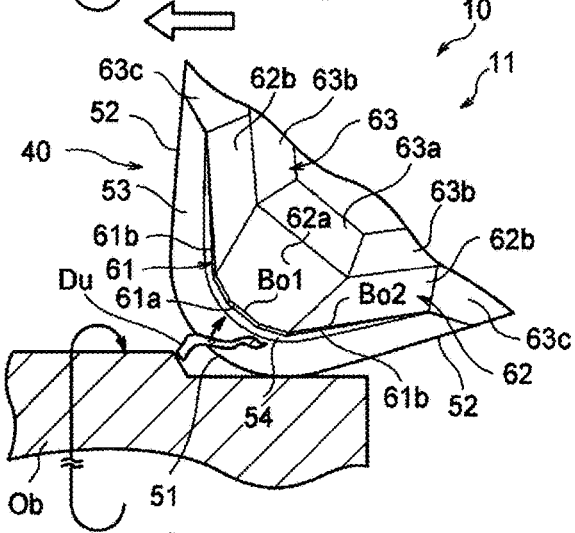
FIG. 8B illustrates a workpiece that is being cut to a depth greater than that in FIG. 8A.
Figure 8C:
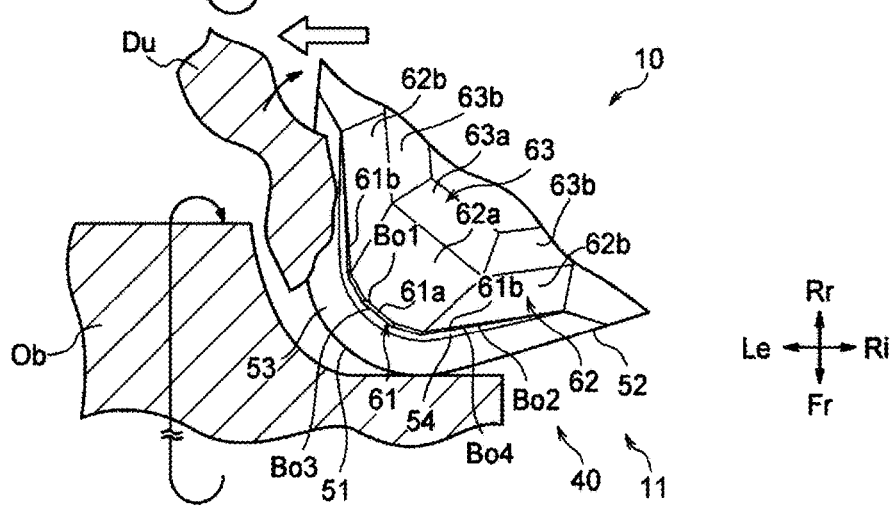
FIG. 8C illustrates a workpiece that is being cut to a depth greater than that in FIG. 8B.

Reference may be made to FIGS. 8A to 8C. These figures may illustrate the manner in which the edge portion 41 comes into contact with the workpiece Ob (see FIG. 1) to cut the workpiece Ob. A portion of the workpiece Ob that has been cut off by the insert 11, for example, may serve as a chip Du. When the workpiece Ob is cut to a small depth by the insert 11, the workpiece Ob may be basically cut only by a portion of the insert 11 around the corner portion 51, and a chip Du with a small width may be generated from the workpiece Ob. When the workpiece Ob is cut to a large depth by the insert 11, the workpiece Ob may be cut by the corner portion 51 and the side portions 52 and 52, and a chip Du with a large width may be generated from the workpiece Ob.

Reference may be made to FIG. 8A. FIG. 8A may illustrate the manner in which the workpiece Ob is cut only by a part of the corner portion 51 of the insert 11 and a chip Du with a small width is generated accordingly. The chip Du with a small width that has been cut off may move, for example, along the rake face 53 toward a boundary Bo0 between the first region 61a extending along the corner portion 51 and the second regions 61b and 61b extending along the side portions 52 and 52. The entirety of the first boundary Bo1, which is the boundary between the first region 61a and the third region 62a, may be positioned above the cutting edge 41a. Since the entirety of the first boundary Bo1 is positioned above the cutting edge 41a, the chip Du may reliably come into contact with the first region 61a (first rising face 61). In other words, the chip Du can be brought into contact with the first region 61a, so that the speed of the chip Du is reliably reduced.

Reference may be made to FIG. 8B. FIG. 8B may illustrate the manner in which the workpiece Ob is cut by a large part of the corner portion 51 of the insert 11 and a chip Du with a small width is generated accordingly. The chip Du with a small width that has been cut off may move, for example, along the rake face 53 toward the first region 61a. The entirety of the first boundary Bo1, which is the boundary between the first region 61a and the third region 62a, may be positioned above the cutting edge 41a. Since the entirety of the first boundary Bo1 is positioned above the cutting edge 41a, the chip Du may reliably come into contact with the first region 61a (first rising face 61). In other words, the chip Du can be brought into contact with the first region 61a, so that the speed of the chip Du is reliably reduced.

Reference may be made to FIG. 8C. FIG. 8C may illustrate the manner in which the workpiece Ob is cut by a portion of the insert 11 around the corner portion 51 and the side portions 52 and 52 and a chip Du with a large width is generated accordingly. The chip Du with a large width that has been cut off may move, for example, along the rake face 53 toward the first region 61a extending along the corner portion 51 and the second regions 61b and 61b extending along the side portions 52 and 52. The second boundaries Bo2 and Bo2, which are the boundaries between the second regions 61b and 61b and the fourth regions 62b and 62b, may include portions positioned below the cutting edge 41a. Since at least portions of the second boundaries Bo2 and Bo2 are positioned below the cutting edge 41a, the chip Du that moves toward the first region 61a and the second regions 61b and 61b may be guided toward the portions of the second boundaries Bo2 and Bo2 positioned below the cutting edge 41a. Accordingly, the possibility that the thick chip Du will come into contact with the first rising face 61 may be reduced. Reduction in speed of the thick chip Du may be reduced.

Reference may be made to FIGS. 5A to 5C and FIGS. 8A to 8C. When, for example, the workpiece Ob is cut only by a portion of the insert 11 around the corner portion 51, the chip Du generated from the workpiece Ob may have a small width. The chip Du with a small width (thin chip Du), for example, may move in an unstable direction and may move toward the workpiece Ob at a predetermined speed. According to the present disclosure, the entirety of the first boundary Bo1, which is the boundary between the first region 61a and the third region 62a, may be positioned above the corner portion 51 (cutting edge 41a). Since the entirety of the first boundary Bo1 is positioned above the cutting edge 41a, the chip Du generated from the workpiece Ob may move along the rake face 53 and may be highly likely to come into contact with the first region 61a (first rising face 61). When the chip Du comes into contact with the first region 61a, the speed of the chip Du can be reduced.

When the workpiece Ob is cut by a portion of the insert 11 around the corner portion 51 and the side portions 52 and 52, the chip Du generated from the workpiece Ob may have a large width. The chip Du with a large width (thick chip Du), for example, may move in a stable direction, but easily remains on the insert 11. The second boundaries Bo2 and Bo2, which are the boundaries between the second regions 61b and 61b the fourth regions 62b and 62b, may include portions positioned below the side portions 52 and 52 (cutting edge 41a). Since at least portions of the second boundaries Bo2 and Bo2 are positioned below the cutting edge 41a, the thick chip Du may be guided toward the portions of the second boundaries Bo2 and Bo2 positioned below the cutting edge 41a. Therefore, the possibility that the chip Du will come into contact with the first rising face 61 can be reduced. As a result, reduction in speed of the thick chip Du can be reduced.

According to the insert 11 of the present disclosure, the speed of the chip Du can be reduced when the chip Du is thin, and reduction in speed of the chip Du can be reduced when the chip Du is thick. Namely, the risk that the chip Du will move toward the workpiece Ob and the risk that the chip Du will remain on the insert 11 can both be reduced. Thus, the insert 11 capable of performing a stable cutting process can be provided.

The second boundaries Bo2 and Bo2 may extend along the side portions 52 and 52, and portions thereof that are farthest from the first boundary Bo1 may be positioned below the side portions 52 and 52 (cutting edge 41a). Since the portions of the second boundaries Bo2 and Bo2 that are farthest from the first boundary Bo1 are positioned below the cutting edge 41a, the thick chip Du more reliably may move along the second regions 61b and 61b. Accordingly, the possibility that the thick chip Du will come into contact with the first region 61a can be further reduced. As a result, the insert 11 capable of performing a more stable cutting process can be provided.

Portions of the second boundaries Bo2 and Bo2 that are closest to the first boundary Bo1 may be positioned above the side portions 52 and 52 (cutting edge 41a). Since the portions of the second boundaries Bo2 and Bo2 that are closest to the first boundary Bo1 are positioned above the cutting edge 41a, the thin chip Du that has been cut off can be reliably brought into contact with the first face 71a when the thin chip Du moves toward the second regions 61b and 61b. Accordingly, the insert 11 capable of performing a more stable cutting process can be provided.

The first boundary Bo1 may be a curved line that is convex toward the cutting edge 41a in the plan view. Accordingly, the first region 61a may include a curved face that is convex toward the cutting edge 41a. Since the first region 61a includes a curved face that is convex toward the cutting edge 41a, the chip Du that has come into contact with the first region 61a, for example, can be guided along the convexly curved face and moved away from the workpiece Ob along the second regions 61b and 61b. Accordingly, the possibility that the chip Du will move toward the workpiece Ob can be further reduced.

The second boundaries Bo2 and Bo2 may be straight lines in the plan view. Since the second boundaries Bo2 and Bo2 are straight lines, the heights of the second regions 61b and 61*b* may gradually change along the second boundaries Bo2 and Bo2. Accordingly, the chip Du may be caused to come into contact with the first rising face 61 or prevented from coming into contact with the first rising face 61 depending on the width thereof. Accordingly, the insert 11 capable of performing a more stable cutting process can be provided.

Reference may be made to FIGS. 4 and 6A. The first region 61*a* may be a curved line that is convex toward the corner portion 51 in a sectional view taken in a horizontal direction. Accordingly, the chip Du that has come into contact with the first region 61*a* can be more reliably guided along the convexly curved face and moved away from the workpiece Ob along the second regions 61*b* and 61*b*. In addition, the first region 61*a* may be a straight line in a sectional view of the cutting insert 11 taken along the bisector of the corner portion 51. Accordingly, the chip Du that has come into contact with the first region 61*a* can be moved upward, and the possibility that the chip Du will remain on the first rising face 61 can be reduced. As a result, the insert 11 capable of performing a more stable cutting process can be provided.

Reference may be made to FIGS. 4 and 6B. The third region 62*a* may be a curved line that is convex toward the corner portion 51 in a sectional view taken in a horizontal direction. Accordingly, the chip Du that has moved upward from the first region 61*a*, for example, can be easily moved further upward. In addition, the third region 62*a* may be a curved line that is outwardly convex in a sectional view taken along the bisector of the corner portion 51. Accordingly, the chip Du can be easily moved toward the second regions 61*b* and 61*b*. The possibility that the chip Du will remain on the second rising face 62 can be reduced. As a result, the insert 11 capable of performing a more stable cutting process can be provided.

Reference may be made to FIGS. 5A to 5C and FIGS. 8A to 8C. Assuming that the lower edge of the first region 61*a* (lower side of the first region 61*a*) is the third boundary Bo3, the distance from the third boundary Bo3 to the lower surface 22 may be constant along the third boundary Bo3. Accordingly, concentration of load in a specific region along the lower side of the first region 61*a* of the insert 11 can be suppressed. In addition, assuming that each of the lower edges of the second regions 61*b* and 61*b* (lower sides of the second regions 61*b* and 61*b*) is the fourth boundary Bo4, the distance from the fourth boundary Bo4 to the lower surface 22 may decrease with increasing distance from the first region 61*a*. Accordingly, portions of the second boundaries Bo2 and Bo2 that are farthest from the first boundary Bo1 can be positioned below the cutting edge 41*a*. As a result, the insert 11 that is durable and capable of performing a more stable cutting process can be provided.

Reference may be made to FIG. 2. The cutting tool 10 may include the insert 11 fixed to the first end 70*a*. Accordingly, the cutting tool 10 capable of performing a stable cutting process on the workpiece Ob can be provided.

Modification

Figure 9:
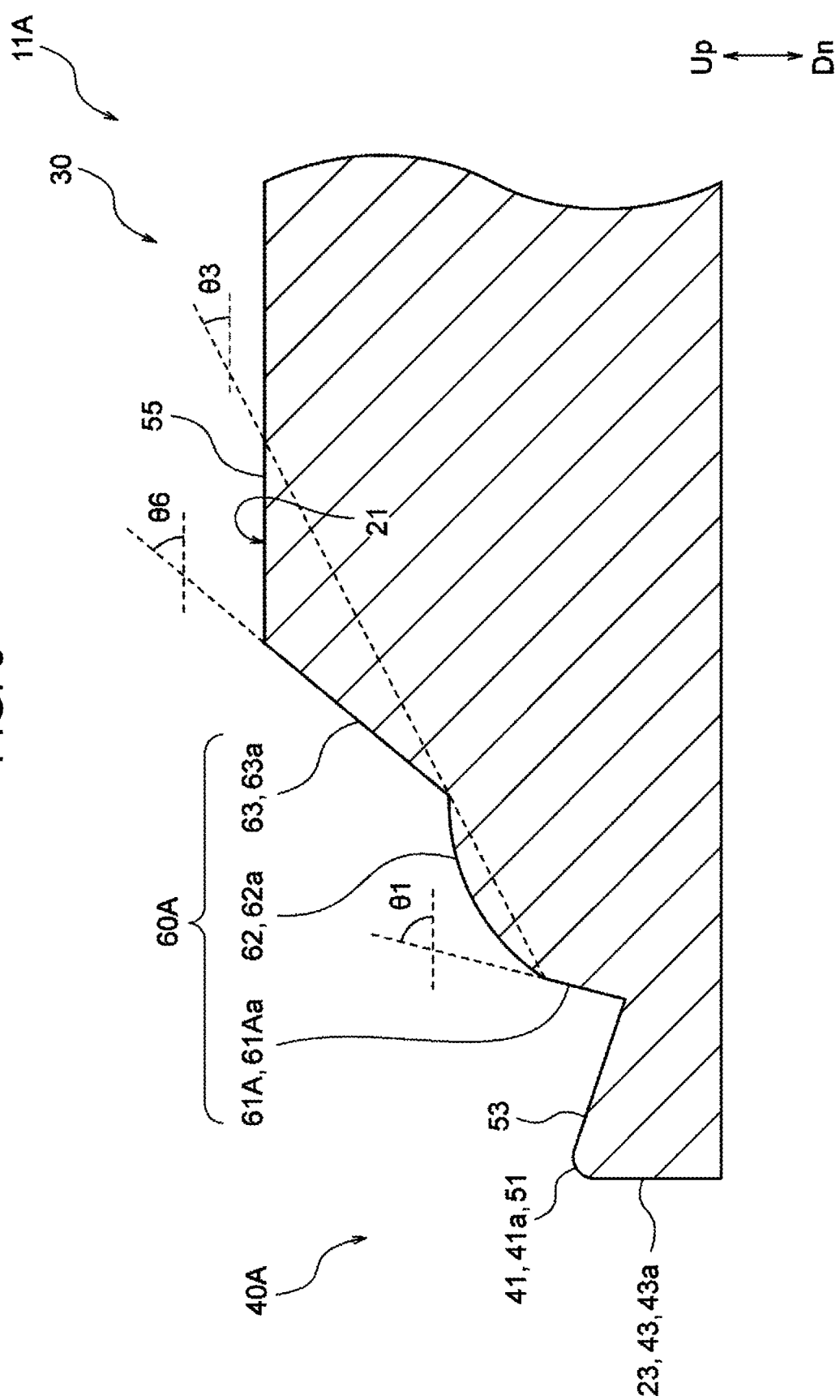
FIG. 9 illustrates an insert according to a modification.

Reference may be made to FIG. 9. FIG. 9 may be a sectional view of an insert 11A according to a modification. FIG. 9 may correspond to FIG. 5A described above.

Components that are the same as to those of the insert 11 according to the embodiment will be denoted by the same reference signs, and detailed description thereof will be omitted.

(Cutting-Portion Upper Surface)

A cutting-portion upper surface 50A may include a corner portion 51, side portions 52 and 52, a rake face 53, and a rising face 60A. A first rising face 61A may be connected to the lower side of the rake face 53. The first rising face 61A may be inclined upward in a direction from the rake face 53 toward a second rising face 62.

A first region 61Aa may be connected to the lower side of the rake face 53 that extends along the corner portion 51. As illustrated in FIG. 9, a groove defined by the rake face 53 and the first region 61Aa may have a substantially V-shape (including a substantially U-shape) in a sectional view taken along a line that bisects the corner portion 51. Thus, the rising face 60 (first rising face 61) may be spaced from the cutting edge 41*a* with only the rake face 53 disposed therebetween.

A third boundary Bo3 may be a boundary between the first region 61Aa and the rake face 53. A fourth boundary Bo4 may be a boundary between a second region 61Ab and the rake face 53.

The insert and the cutting tool according to the present disclosure are not limited to the above-described embodiment and modification. Some examples of the insert and the cutting tool according to modified embodiments will now be described.

For example, in the above-described embodiment, the rising face may include the first to third rising faces. However, the insert according to the present disclosure may be formed such that, for example, the third rising face is omitted as necessary. In other words, the second rising face may be directly connected to the connecting face. For example, the third region may be connected to a portion of the connecting face that extends along the corner portion, and the fourth regions may be connected to portions of the connecting face that extend along the side portions.

For example, in the above-described embodiment, the illustrated cutting tool may be a right-hand cutting tool. However, the cutting tool according to the present disclosure is not limited to a right-hand cutting tool, and may instead be a left-hand cutting tool. Alternatively, the cutting tool according to the present disclosure may be a neutral cutting tool.

The invention claimed is:

1. A cutting insert, comprising:
   an upper surface;
   a lower surface positioned at a side opposite to the upper surface;
   a lateral surface connected to the upper surface and the lower surface; and
   a cutting edge positioned at an intersection of the lateral surface and the upper surface;
   wherein the upper surface comprises
      a corner portion defined by a boundary between the upper surface and the lateral surface, the corner portion having a shape of a curved line that is outwardly convex in a plan view of the upper surface,
      a side portion directly connected to the corner portion and forming the cutting edge together with the corner portion,
      a rake face that extends along the side portion and the corner portion and extends downward with increasing distance from the side portion and the corner portion,
      a first rising face that is separated from the cutting edge with the rake face disposed therebetween and extends upward with increasing distance from the rake face, and a second rising face that is connected to an upper portion of the first rising face and extends upward with increasing distance from the first rising face, wherein the first rising face comprises
- a first sub-face that extends along the corner portion, and
- a second sub-face that extends along the side portion, wherein the second rising face comprises
- a third sub-face that extends along the corner portion, and
- a fourth sub-face that extends along the side portion, wherein an inclination angle of the first sub-face is greater than an inclination angle of the third sub-face in a first sectional view taken along a bisector of the corner portion, wherein an inclination angle of the second sub-face is greater than an inclination angle of the fourth sub-face in a second sectional view taken in a direction orthogonal to the side portion, wherein an entirety of a first boundary, which is a boundary between the first sub-face and the third sub-face, is positioned above the cutting edge along the corner portion, wherein a second boundary, which is a boundary between the second sub-face and the fourth sub-face, includes
- a first portion positioned above the cutting edge along the side portion, and
- a second portion positioned below the cutting edge along the side portion, and wherein a height of the second boundary decreases from the first portion to the second portion in a direction along the side portion and away from the corner portion.

2. The cutting insert according to claim 1, wherein at least a part of the second portion is positioned farthest from the first boundary.

3. The cutting insert according to claim 1, wherein at least a part of the first portion is closest to the first boundary.

4. The cutting insert according to claim 1, wherein the first boundary is a curved line that is convex toward the corner portion in the plan view.

5. The cutting insert according to claim 1, wherein the second boundary is a straight line in the plan view.

6. The cutting insert according to claim 1, wherein the first sub-face comprises a curved line that is curved along the corner portion in a sectional view taken in a horizontal direction, and is a straight line in the first sectional view taken along the bisector of the corner portion.

7. The cutting insert according to claim 1, wherein the third sub-face is a curved line that is convex toward the corner portion in a sectional view taken in a horizontal direction, and is a curved line that is outwardly convex in the first sectional view taken along the bisector of the corner portion.

8. A cutting tool comprising:
a holder that extends from a first end to a second end; and
the cutting insert according to claim 1 that is fixed at the first end.

9. A method for cutting a workpiece, the method comprising the steps of:
rotating a workpiece;
cutting the workpiece by bringing the cutting tool according to claim 8 into contact with the workpiece that is being rotated; and
removing the cutting tool from the workpiece that has been cut.

10. The cutting insert according to claim 1, wherein the upper surface further comprises a third rising face that is connected to an upper portion of the second rising face and extends upward with increasing distance from the cutting edge.

11. The cutting insert according to claim 1, wherein the height of the second boundary gradually decreases from the first portion to the second portion in the direction along the side portion and away from the corner portion.

12. The cutting insert according to claim 1, wherein the upper surface further comprises a joining face connected to the first rising face, and located between the rake face and the first rising face, and
wherein a distance from the lower surface to a third boundary, which is a boundary between the first sub-face and the joining face, is constant along the third boundary.

13. The cutting insert according to claim 12, wherein a fourth boundary, which is a boundary between the second sub-face and the joining face, includes
a first point, and
a second point positioned farther away from the corner portion than the first point, and
wherein a distance from the lower surface to the first point is greater than a distance from the lower surface to the second point.

14. The cutting insert according to claim 13, wherein a distance from the lower surface to the fourth boundary decreases in the direction along the side portion and away from the corner portion.

15. The cutting insert according to claim 1, wherein the second rising face further comprises a fifth sub-face that extends along the side portion, the fifth sub-face connected to the fourth sub-face and positioned farther away from the corner portion than the fourth sub-face, and
an inclination angle of the fifth sub-face in a third sectional view taken in the direction orthogonal to the side portion is different from the inclination angle of the fourth sub-face in the second sectional view taken in the direction orthogonal to the side portion.

* * * * *